United States Patent
Sun et al.

(10) Patent No.: US 6,636,962 B1
(45) Date of Patent: Oct. 21, 2003

(54) SELF-INITIALIZING CHIPSET

(75) Inventors: Jiming Sun, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/459,743

(22) Filed: Dec. 10, 1999

(51) Int. Cl.[7] .............................................. G06F 9/445
(52) U.S. Cl. ............................................................ 713/1
(58) Field of Search ........................................ 713/1, 2

(56) References Cited

U.S. PATENT DOCUMENTS 5,918,047 A * 6/1999 Leavitt et al. ................. 713/2
6,324,644 B1 * 11/2001 Rakavy et al. ................. 713/1

OTHER PUBLICATIONS

Dhiraj, K., et al; *Fault–Tolerant Computing Theory and Techniques*; vol. 1; Englewood Cliffs, NJ; Prentice Hall (1986); pps. 105–116 and 162–164.

* cited by examiner

Primary Examiner—Thomas M. Heckler
(74) Attorney, Agent, or Firm—Marger Johnson & McCollom, PC

(57) ABSTRACT

A chipset in a computer system is initialized without intervention by the processor, thereby reducing the time required to boot the computer system. The system includes a non-volatile storage device for storing configuration data for the chipset. Logic circuitry loads the configuration data into configuration registers in the chipset. The storage device and logic circuitry can be integrated into the chipset. A data pump can be used to load the configuration data into the configuration registers by serially pumping configuration data onto a scan line coupled to the configuration registers. In a system having more than one chipset, the chipsets can be initialized simultaneously to further reduce the amount of time required to boot the system. The configuration data can be downloaded into the storage device when the system is manufactured, or it can be downloaded from the processor the first time the system is powered up.

18 Claims, 6 Drawing Sheets

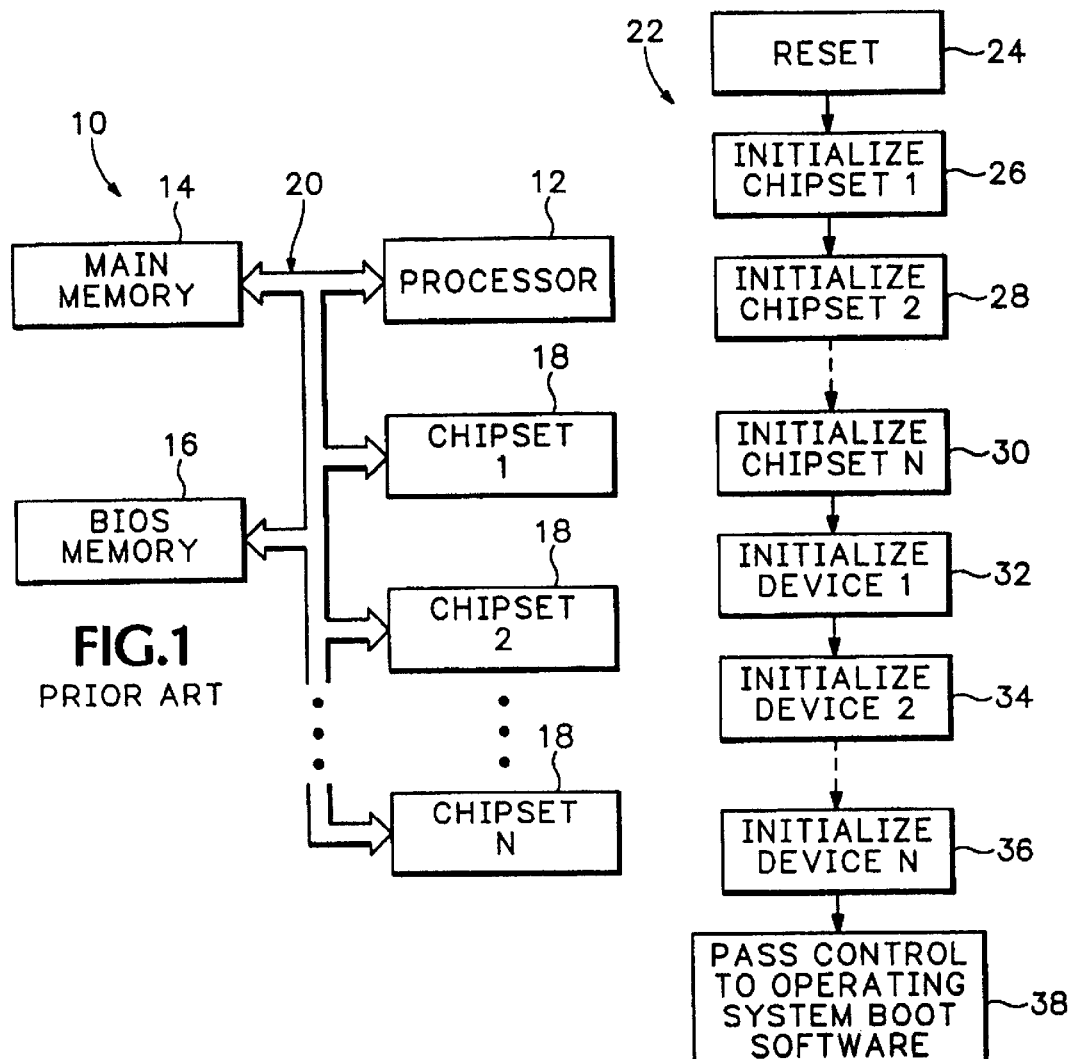

SELF-INITIALIZING CHIPSET

BACKGROUND OF THE INVENTION

1. Field of the Invention

The present invention relates generally to computers having chipsets, and more particularly, to a method and apparatus for self-initializing a chipset.

2. Description of the Related Art

FIG. 1 is block diagram of a prior art computer system 10 having a processor 12, a main memory device 14, a nonvolatile memory device 16, and one or more chipsets 18. All of the components in FIG. 1 are interconnected through a main bus 20 (also referred to as the "processor bus").

The main memory device stores program code for the operating system and for high-level applications. The nonvolatile memory device stores system firmware program code which the processor executes when performing low-level hardware-specific operations. The system firmware program code includes a boot portion, which is executed when the system is reset, and a run-time services portion, which is executed utilized after system has reached a normal operating state. Each one of the chipsets is generally associated with a major functional block of the system. For example, in a system based on an Intel® Pentium® II processor, one of the chipsets includes the "north bridge" and "south bridge" chips, which interface the main bus to other buses in the system. Some chipsets might only have a single chip, for example, a video display driver chip, and some systems might only have a single chipset.

When the system is reset, it goes through a boot process wherein the processor performs all of the tasks required to bring the system to the normal operating state. A prior art boot process 22 is illustrated in FIG. 2. The boot process begins when the system is reset at 24. At 26 through 30, the processor executes the boot portion of the system firmware code which causes the processor to sequentially initialize the chipsets by loading configuration data into configuration registers in the chipsets through the main bus 20. The system firmware boot code then performs other boot tasks, for example, initializing devices at 32 through 36. Control of the processor is then passed to a boot portion of the operating system code at 38.

FIG. 3 is a block diagram of a prior art chipset. The chipset 40 includes a set of configuration registers 42. Although most practical chipsets are likely to have several configuration registers, the set of configuration registers in a very simple chipset might have only one register. The chipset also includes a bus interface 50 for interfacing the chipset to the processor through the main bus 20.

Some prior art chipsets include scan lines for testing and monitoring the performance of the chipset. The chipset shown in FIG. 3 includes a diagnostics scan line 52, which is used for troubleshooting the chipset, and a performance data collection scan line 54, which is used to collect run-time information for evaluating the performance of the chipset. The scan lines can be realized with any suitable scan techniques such as those disclosed in Fault-Tolerant Computing Theory and Techniques, Vol. 1, Dhiraj K. Pradham, ed., pp. 105–116, 1986.

The scan lines are controlled by scan line logic 56 which is accessible through a separate bus 58, typically an Inter Integrated Circuit ($I^2C$) bus such as $I^2C$ Version 2.0, published December 1998 by Philips Semiconductors. The scan lines and separate bus allow the chipset to be tested and monitored independently of the processor.

SUMMARY

In a computer system having a processor and a chipset in accordance with the present invention, the chipset is initialized without intervention by the processor.

BRIEF DESCRIPTION OF THE DRAWINGS

FIG. 1 is a block diagram of a prior art computer system.

FIG. 2 is a flow diagram of a prior art boot process.

DETAILED DESCRIPTION

Figure 3:
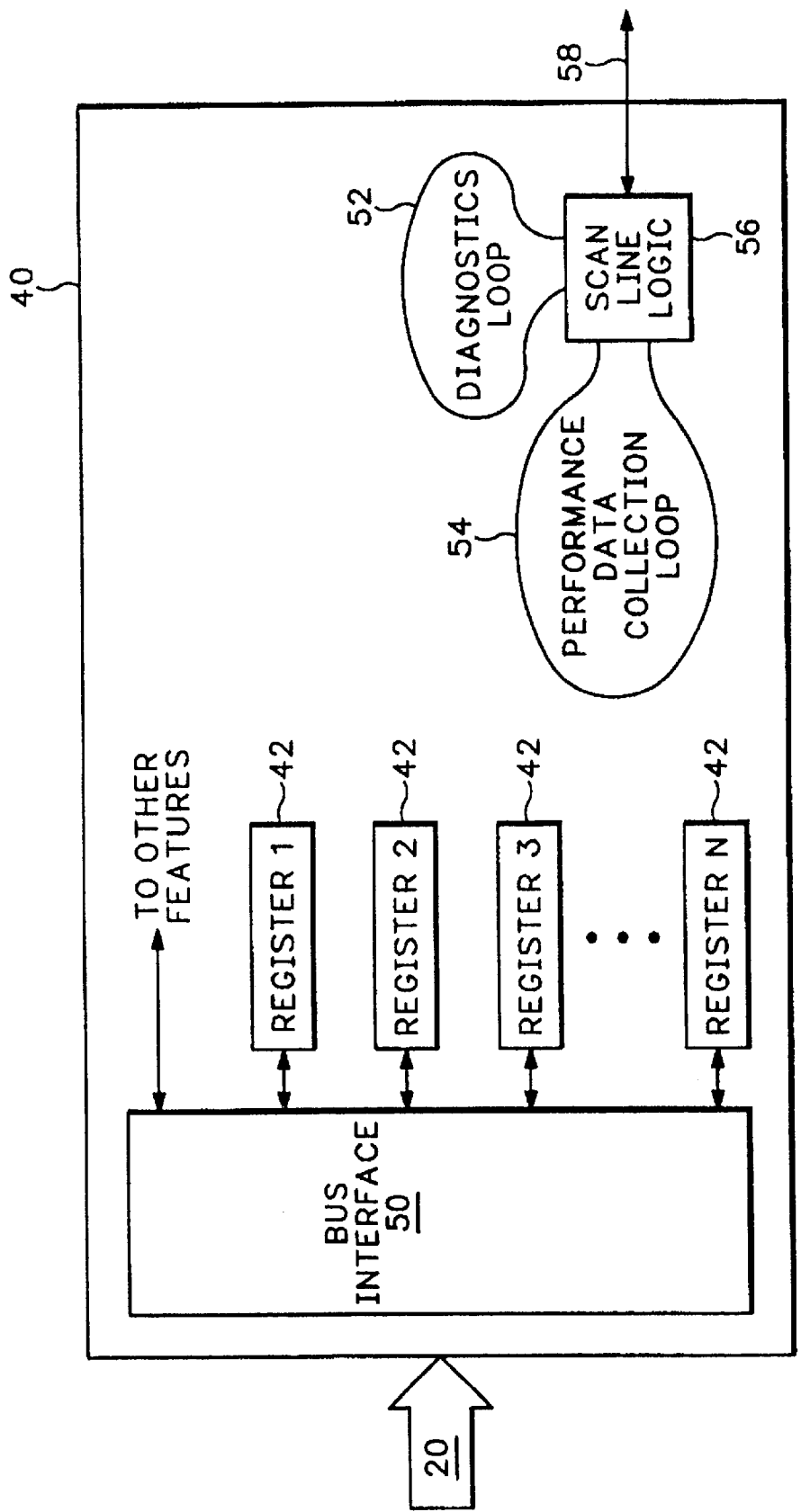
FIG. 3 is block diagram of a prior art chipset.
Figure 4:
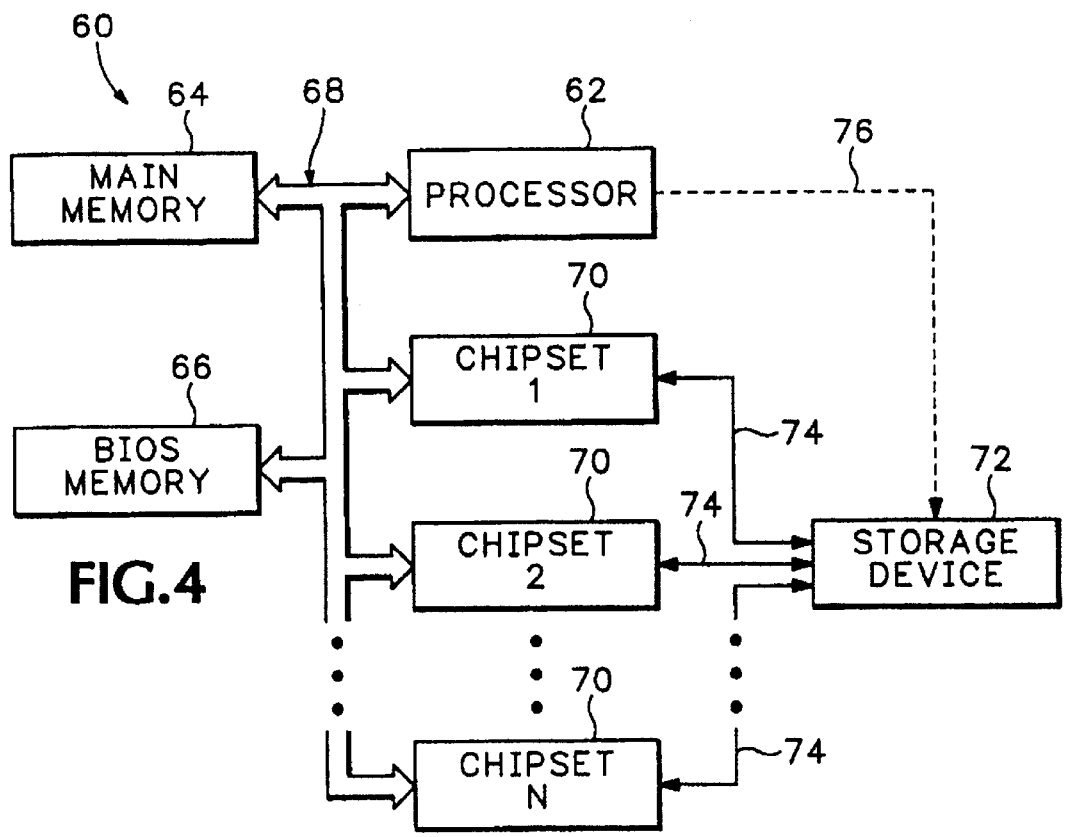
FIG. 4 is a block diagram of an embodiment of a computer system in accordance with the present invention.

FIG. 4 is a block diagram of an embodiment of a computer system 60 in accordance with the present invention. The system 60 includes a processor 62, a main memory device 64, a nonvolatile memory device 66 and a bus 68 much like those in the system of FIG. 1. However, the system of FIG. 4 has one or more chipsets that are adapted so that they can be initialized without intervention by the processor. Initialization data for the chipsets is stored in a storage device 72 which is preferably a nonvolatile memory device. The storage device 72 is coupled to the chipsets through data paths 74 for loading configuration data from the storage device into the configuration registers in the chipsets. An interface 76 is optionally coupled between the processor 62 and the storage device 72 for downloading configuration data into the storage device.

During the boot process, the chipsets are initialized by loading configuration data from the storage device into the configuration registers in the chipsets. This reduces the amount of time required to boot the computer system because the processor does not have to load the configuration data in to the chipsets. Instead, the processor can perform other boot tasks at the same time chipsets are being initialized. This also reduces the amount of system firmware boot code needed in nonvolatile memory device 66 and simplifies the process of writing system firmware boot code. If there is more than one chipset, they can be initialized simultaneously, thereby further reducing the amount of time required to boot the system.

The configuration data can be downloaded into the storage device 72 in different ways. For example, it can be downloaded by an assembly line worker when the computer system is manufactured. Alternatively, it can be downloaded from the processor under the control of system firmware code through interface 76 the first time the chipset is powered up, or after detecting completion of hardware reconfiguration.

Figure 5:
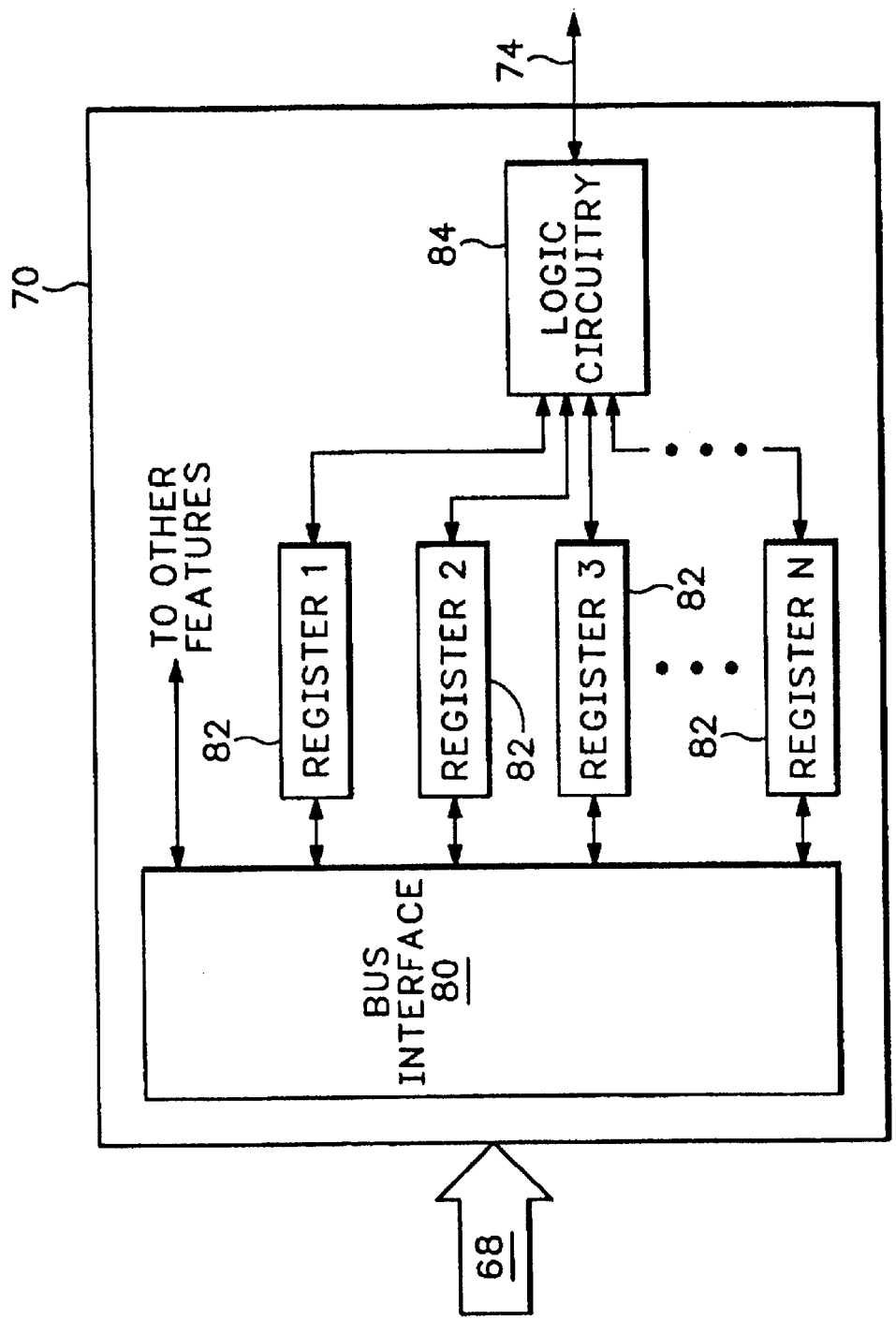
FIG. 5 is a block diagram of an embodiment of the chipset shown in FIG. 4 in accordance with the present invention.

FIG. 5 is a block diagram of one possible embodiment in accordance with the present invention of the chipset 70 shown in FIG. 4. The chipset shown in FIG. 5 includes a bus interface 80, a set of configuration registers 82, and logic circuitry 84. The bus interface 80 interfaces the chipset to the processor through the bus 68. However, the configuration registers need not be loaded with configuration data through the bus interface. Instead, logic circuitry 84 loads configuration data from data path 74 into the configuration registers.

Figure 6:
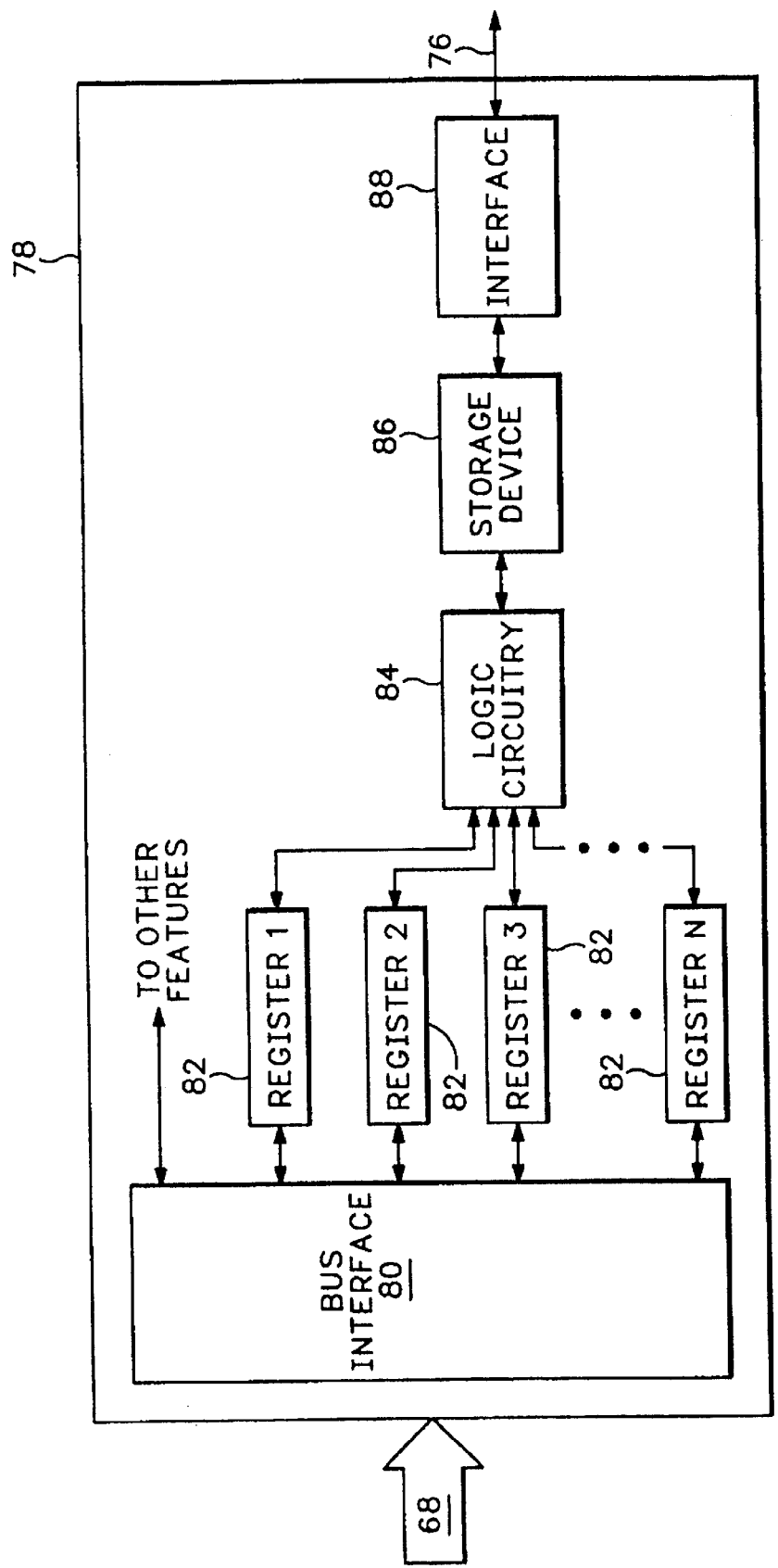
FIG. 6 is block diagram of an alternative embodiment of a chipset in accordance with the present invention.

FIG. 6 is a block diagram of an alternative embodiment of a chipset 78 having internal storage for configuration data in accordance with the present invention. The chipset 78 includes a bus interface 80, a set of configuration registers 82, and logic circuitry 84 similar to those shown in FIG. 5. However, the chipset of FIG. 6 also includes a storage device 86 coupled to logic circuitry 84 and an interface 88 coupled to the storage device. The storage device stores configuration data which is loaded into configuration registers through the logic circuitry during the boot process. Configuration data can be downloaded into the storage device through downloading interface 88.

If the chipset 78 of FIG. 6 is used in place of the chipset 70 shown in FIGS. 4 and 5, the storage device 72 is eliminated, and configuration data can be downloaded directly into the chipset through data path 76.

Figure 7:
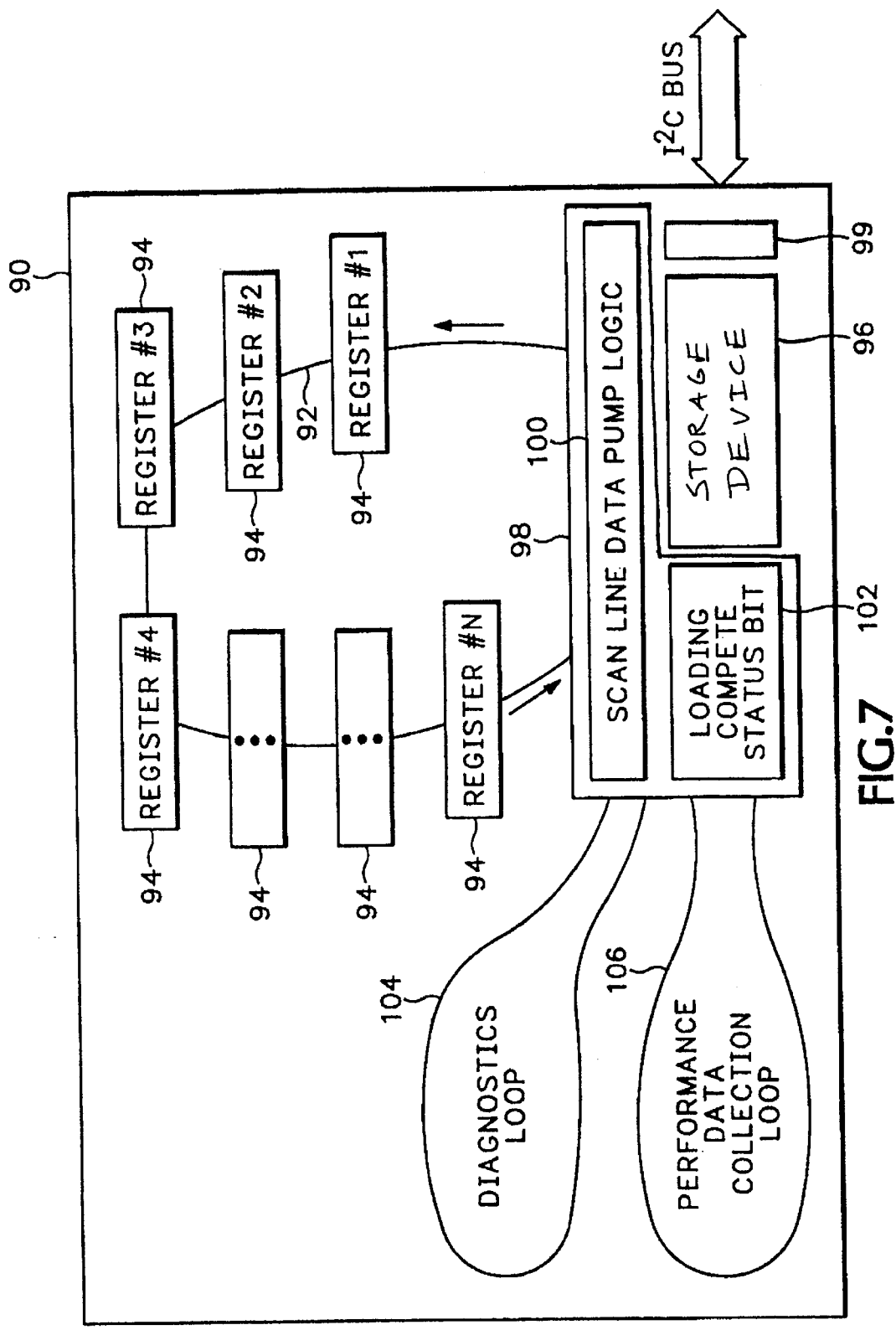
FIG. 7 is a block diagram of a chipset having a scan line for loading configuration data into configuration registers in accordance with the present invention.

FIG. 7 is a block diagram of a chipset 90 having a scan line for loading configuration data into configuration registers in accordance with the present invention. Chipset 90 includes a set of configuration registers 94, a scan line 92 coupled to the configuration registers 94, a storage device 96, logic circuitry 98, and a data interface 99. The logic circuitry includes a scan line data pump circuit 100, which can write data to and read data from the configuration registers, and a loading complete status bit 102. The storage device 96 is preferably an EEPROM. The chipset optionally includes a diagnostics scan line 104 and a performance data collection scan line 106. The scan lines can be realized with any suitable scan techniques such as those disclosed in Fault-Tolerant Computing Theory and Techniques, Vol. 1, Dhiraj K. Pradham, ed., pp. 105–116, 1986.

Configuration data is downloaded into the storage device 96, through the interface 99, which, in a preferred embodiment, interfaces the chipset to an I$^2$C bus. When the chipset receives a "load configuration" command, the scan line data pump logic shifts configuration data from the storage device onto the scan line 92, which transfers the configuration data to the registers. When all of the data has been loaded, the loading complete status bit is set and the scan line data pump logic stops shifting data.

Figure 8:
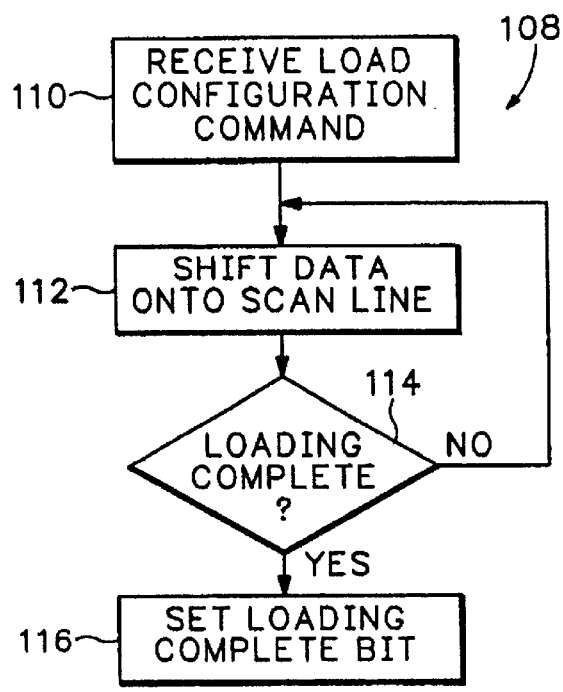
FIG. 8 is a flow diagram of an embodiment of a method for initializing a chipset in accordance with the present invention.

FIG. 8 is a flow diagram of an embodiment of a method 108 for initializing a chipset in accordance with the present invention. The method begins at 110 when the chipset receives the "load configuration" command. Configuration data is then shifted onto the scan line at 112. If the loading process is not complete at 114, the system continues shifting data onto the scan line at 112. Otherwise, the system stops loading data and sets the loading complete status bit at 116.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A computer system comprising:
   a processor;
   a first storage device coupled to the processor for storing system firmware code;
   a chipset coupled to the processor, wherein the chipset includes a set of configuration registers; and
   a second storage device for storing configuration data, wherein the second storage device is coupled to the set of configuration registers for loading configuration data into the set of configuration registers.

2. A computer system according to claim 1 wherein the second storage device is integral with the chipset.

3. A computer system according to claim 1 wherein the second storage device is a nonvolatile storage device.

4. A computer system according to claim 1 further including a second chipset coupled to the processor, wherein the second chipset includes a second set of configuration registers, and the second storage device is coupled to the second set of configuration registers for loading configuration data into the second set of configuration registers.

5. A computer system according to claim 1 wherein the second storage device includes an interface for downloading configuration data into the second storage device.

6. A computer system according to claim 5 wherein the interface is an interface for an I$^2$C bus.

7. A computer system according to claim 1 further including a data path coupled between the second storage device and the processor for downloading configuration data from the processor into the second storage device.

8. A computer system according to claim 7 wherein the system firmware code includes computer readable program code that causes the processor to download configuration data into the storage device the first time the chipset is powered up.

9. A chipset having a bus interface for interfacing from the processor, wherein the chipset is adapted so that it can be initialized without intervention from the processor, and wherein the chipset comprises:
   a set of configuration registers;
   a storage device for storing configuration data; and
   logic circuitry coupled between the storage device and the set of configuration registers for loading the configuration data into the set of configuration registers.

10. A chipset according to claim 9 further including a scan-line coupled to the set of configuration registers, and wherein the logic circuitry includes a data pump coupled between the scan-line and the storage device.

11. A chipset according to claim 9 wherein the logic circuitry includes a register for a loading complete status bit.

12. A chipset according to claim 9 further including an interface for downloading configuration data into the storage device.

13. A chipset according to claim 12 wherein the interface is an I$^2$C interface.

14. A chipset according to claim 9 wherein the storage device is a nonvolatile storage device.

15. A method for booting a computer system having a processor and a chipset coupled to the processor, the method comprising initializing the chipset without intervention by the processor, wherein initializing the chipset includes loading configuration data from a storage device into a set of configuration registers in the chipset.

16. A method according to claim 15 wherein loading configuration data includes pumping data onto a scan-line.

17. A method according to claim 15 further including downloading configuration data into the storage device the first time the chipset is powered up.

18. A method according to claim 15 wherein the storage device is a nonvolatile storage device.

* * * * *